United States Patent [19]

Koshiba et al.

[11] Patent Number: 5,002,923

[45] Date of Patent: Mar. 26, 1991

[54] CATALYST SUPPORT FOR CATALYTIC REACTORS

[75] Inventors: Yoshikazu Koshiba; Takeshi Kamiya; Yuji Ikegami; Noboru Tachino, all of Kawasaki, Japan

[73] Assignee: Nippon Yakin Kogyo Co., Ltd., Tokyo, Japan

[21] Appl. No.: 383,009

[22] Filed: Jul. 21, 1989

[30] Foreign Application Priority Data

Jul. 22, 1988 [JP] Japan ................................ 63-181665

[51] Int. Cl.$^5$ ........................ B01J 32/00; B01J 35/02; B01J 35/04
[52] U.S. Cl. .................................... 502/439; 502/527
[58] Field of Search ................................ 502/439, 527

[56] References Cited

U.S. PATENT DOCUMENTS

| | | | |
|---|---|---|---|
| 4,433,064 | 2/1984 | Pignon | 502/527 X |
| 4,719,680 | 1/1988 | Cyron | 502/527 X |
| 4,777,158 | 10/1988 | Cyron | 502/527 X |

FOREIGN PATENT DOCUMENTS

| | | | |
|---|---|---|---|
| 245738 | 11/1987 | European Pat. Off. | 502/439 |
| 3726502 | 3/1988 | Fed. Rep. of Germany | 502/439 |
| 63-36843 | 2/1988 | Japan | 502/527 |

Primary Examiner—W. J. Shine
Attorney, Agent, or Firm—Sherman and Shalloway

[57] ABSTRACT

Disclosed is a catalyst support for catalytic reactors for cleaning exhaust gas, characterized in that flat steel band plates and corrugated steel band plates, each of which is heat-resistance and covered with catalyst, are superposed in such a way that one comes on top of the other alternately, and brazed together on their center line running along the longitudinal direction thereof.

4 Claims, 2 Drawing Sheets

CATALYST SUPPORT FOR CATALYTIC REACTORS

FIELD OF THIS INVENTION

This invention relates to a catalyst support for catalytic reactors for cleaning automobiles' exhaust gas.

PRIOR ART

In order to construct such catalyst support, generally flat steel band plates and corrugated steel band plates, each of which is heat-resistant and covered with catalyst, are laid so that one comes on top of the other alternately, and rolled up together into a cylindrical form, usually called honeycomb structure. However, only with this, the cylindrical honeycomb structure is deformed in such a manner as to be called "telescope" in the direction along which exhaust gas flows. Therefore, the steel band plates need soldering to prevent such deformation.

In this respect, disclosed in Japanese patent application laid-open publication No. sho 61-199574 is a soldering method to apply for the honeycomb structure. According to the method, all of the plates are soldered at one or both of the ends of the honeycomb structure by heating binder and powdered solder previously applied thereto. Consequently, components contained in the solder diffuse into the nearby region and make such a solid solution there that desirable properties inherent in the steel plates are injured by the soldering, and the adhesion of catalyst to the plates, and the effectiveness of catalyst are affected in result.

In the meantime, the catalytic action is brought out most remarkably near the ends of the honeycomb structure by turbulent flows happening there, so that it can be said that the capacity and the life of such honeycomb structured catalyst support have so far been greatly reduced by the conventional careless way of brazing.

SUMMARY OF THE INVENTION

Under the circumstances, the inventors had made intensive studies to eliminate the above mentioned drawbacks inherent in the conventional honeycomb structured catalyst support, and finally accomplished this invention, finding that brazing in the central portion gives far less bad influence on the catalytic action than brazing in the terminal portion of the honeycomb structured catalyst support. Accordingly, it is an object of this invention to provide a catalyst support for catalytic reactors that is able to minimize the loss of the catalytic action by the brazing to the greatest extent.

That is, this invention concerns a catalyst support for catalytic reactors for cleaning exhaust gas, characterized in that flat steel band plates and corrugated steel band plates, each of which is heat-resistant and covered with catalyst, are laid in such a way that one comes on top of the other alternately, and brazed together on their center line running along the longitudinal direction thereof. Briefly, the cylindrical, honeycomb structured catalyst support of this invention is devised in such a way as to minimize a bad influence on the catalytic action and increase the catalytic efficiency to the greatest extent by brazing flat and corrugated steel band plates, alternately superposed, on their center line running along their longitudinal direction.

PREFERRED EMBODIMENT OF THIS INVENTION

Figure 1:
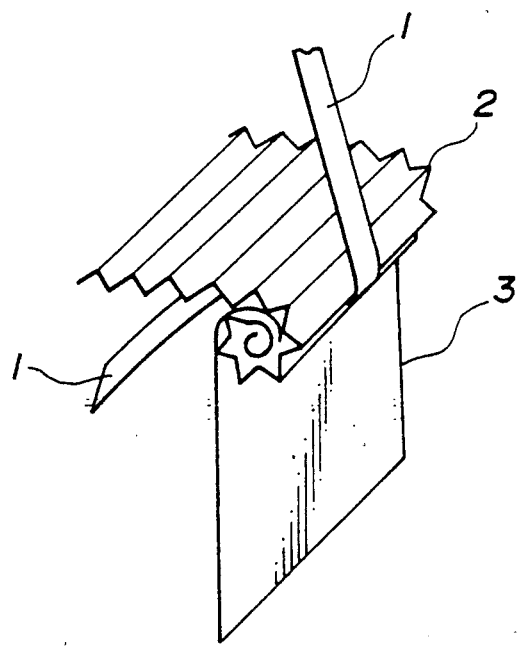
FIG. 1 is an illustration showing a process for building up a cylindrical, honeycomb structured catalyst support of this invention.

The catalyst support of this invention may be made up into any shape; in other words, there is no particular restriction in shape if only it is constructed of flat heat resistant steel band plates and corrugated heat resistant steel band plates by laying one on top of the other alternately. However, it is desirable for the superposed flat and corrugated steel plates to be formed into a cylindrical, honeycomb structure by rolling them up together.

The heat resistant steel plates of this invention include an aluminium-plated ferrite stainless steel plate of which the surface is enriched with diffused aluminium, as disclosed in Japanese patent application laid-open publication No. hei 1-142073. Also, a nickel-based brazing material can be favorably used as the brazing material of this invention, considering the condition under which the catalyst support is put to use.

The portion to be brazed along the center line of the steel band plates is desirable to be as narrow as possible, if only it can bear the condition under which the catalyst support is put to use. Considering the practical condition, however, its width is desirable to be about 10–20 percent of the width of the steel band plates.

In the shape of the brazing material of this invention, there is also no special restriction. That is, the brazing material can take any shape unless its shape interrupts the steel band plates from being superposed or rolled up into a cylindrical, honeycomb structure. For this, foiled or powdered brazing material can be applied on the center line of the steel band plates continuously or discontinuously, and heated at a given temperature in a specified atmosphere. If the catalyst support is desired to be formed into a honeycomb structure as shown in the drawing, it is preferable to apply foiled brazing material on the center line of the steel band plates continuously or discontinuously.

Recently, foiled brazing material is so easily available in the market that it is preferable to use the brazing material of this type in place of thin plate-type or powdered brazing materials. Its brazing can make do with a simple brazing apparatus.

A production process of the catalyst support of this invention will now be described in more detail with reference to the attached drawing by way of example, but the example is not to be construed to limit the scope of this invention.

EXAMPLE

Figure 2:
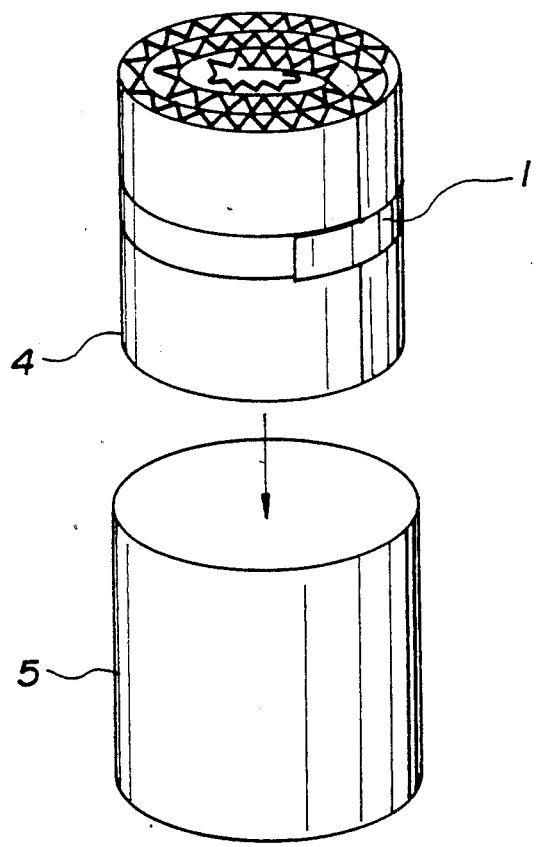
FIG. 2 is a perspective view of a completed cylindrical, honeycomb structured catalyst support of this invention, and a case for holding the same.

A cylindrical, honeycomb structured catalyst support, 70 mm across, is formed by laying a 75 mm-wide corrugated steel band plate 2 on top of a 75 mm-wide flat steel band plate 3, and rolling them up together. Before the steel band plates 2, 3 are rolled up, a length of Ni-based brazing foil 1, 20 um thick and 10 mm wide, is put on their center line so as to be sandwiched between them. The brazing foil is made as much long as its outer end can make a round trip around the cylindrical catalytic support, as shown in FIG. 2. When the brazing foil is sandwiched, a microspot welder is used, if necessary, in order to avoid injuries and slackening of the brazing foil possibly happening between the steel band plates.

After completed, the cylindrical, honeycomb structured catalyst support is put in a case 5, of which the inner diameter is 70 mm, the height is 80 mm and the wall thickness is 1 mm, as shown in FIG. 2. Brazing is in vacuum, and a protective gas. On brazing, it is desirable to lay the cylindrical catalytic support flat on its side in order to prevent the molten brazing material from oozing out.

As stated above, the catalyst support of this invention is produced by brazing flat and corrugated steel band plates only on their center line, where the catalytic action is least affected by brazing, so that its efficiency can be kept very high. Compared with conventional catalytic supports of this type, it is excellent not only in the catalytic efficiency but also in the adhesion of catalyst thereto and the retainability of the catalytic action.

What is claimed is:

1. A catalyst support for catalytic reactors for cleaning exhaust gas, characterized in that flat steel band plates and corrugated steel band plates, each of which is heat-resistant and covered with catalyst, are superposed in such a way that one comes on top of the other alternately, and brazed together on their center line running along the longitudinal direction thereof.

2. A catalyst support according to claim 1, which is formed into a cylindrical, honeycomb structure by rolling up said superposed flat and corrugated steel band plates together.

3. A catalyst support according to claim 1, in the production progress of which said flat and corrugated steel band plates are brazed by using a foil brazing material.

4. A catalyst support according to claim 1, in the production progress of which said flat and corrugated steel band plates are brazed by using a foil brazing material which is sandwiched between them before they are superposed.

* * * * *